United States Patent [19]

Granetzke

[11] 4,434,773

[45] Mar. 6, 1984

[54] VALVE CONTROLLED FUEL HEATER WITH SELF-ADJUSTING VALVE

[75] Inventor: Dennis C. Granetzke, Racine, Wis.

[73] Assignee: Modine Manufacturing Company, Racine, Wis.

[21] Appl. No.: 296,899

[22] Filed: Aug. 27, 1981

[51] Int. Cl.³ .................................. F02M 31/00
[52] U.S. Cl. ............................ 123/557; 123/552
[58] Field of Search ............. 123/557, 552; 165/35; 251/86

[56] References Cited

U.S. PATENT DOCUMENTS

| | | | |
|---|---|---|---|
| 2,404,349 | 7/1946 | Brant | 251/86 |
| 2,670,933 | 3/1954 | Bay | 165/35 |
| 2,719,518 | 10/1955 | Newman | 123/551 |
| 2,788,176 | 4/1957 | Andersen | 123/557 |
| 3,396,743 | 8/1968 | Mackal | 251/86 |
| 3,398,891 | 8/1968 | Horne | 165/35 |
| 4,231,342 | 11/1980 | Johnston | 123/557 |

Primary Examiner—Ronald H. Lazarus
Attorney, Agent, or Firm—Wood, Dalton, Phillips, Mason & Rowe

[57] ABSTRACT

A fuel heater having a fuel passage therethrough and heated means as a part of the heater with a valve body movable between a first position and a second position by a temperature responsive means, the valve body at the first position directing the fuel through a first path in heat receiving relationship with the heated means and at the second position directing substantially all the fuel through a second path away from the heated means. The heater also includes hinge means operatively connecting the elongated valve stem and the valve body for permitting relative lateral movement therebetween and thereby tending to prevent binding of the valve body in a tube in which the valve body and stem are located.

8 Claims, 10 Drawing Figures

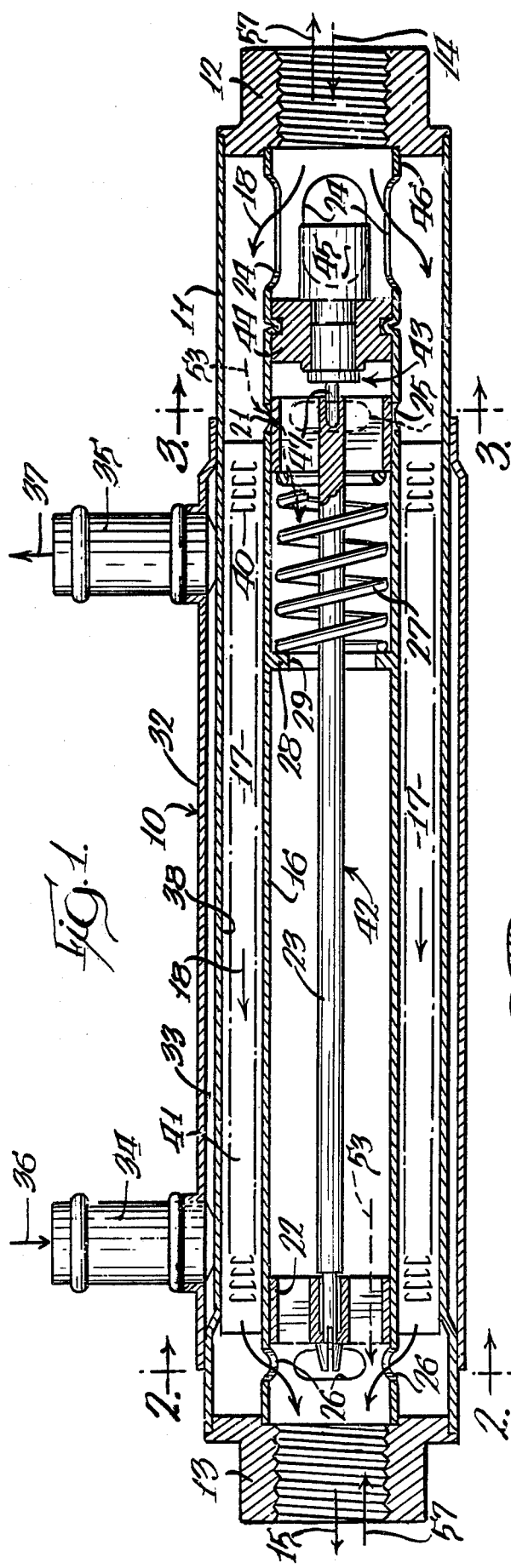
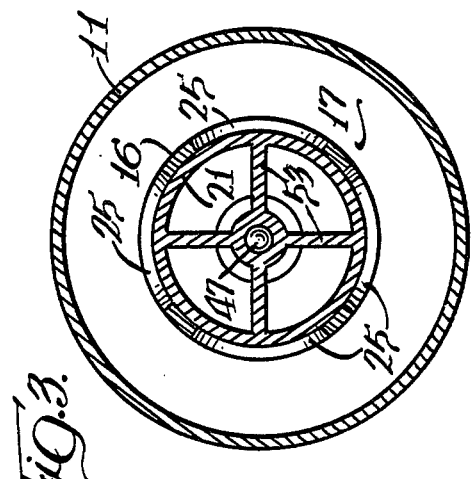
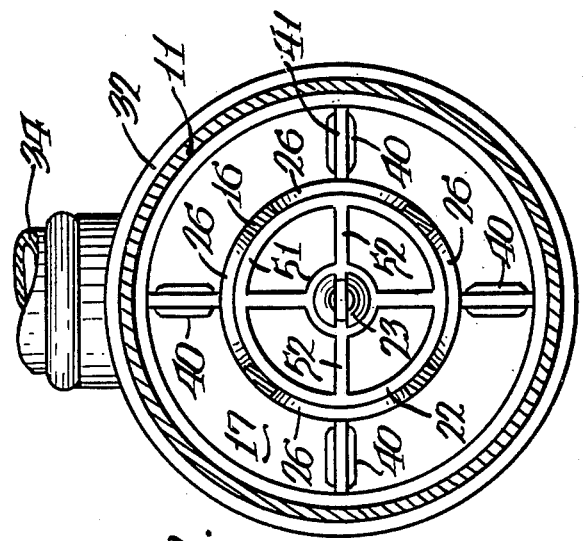

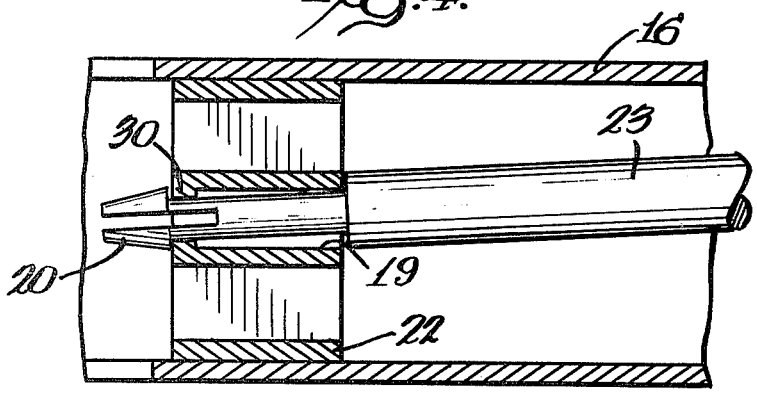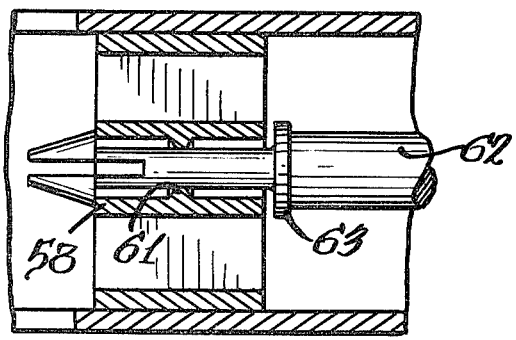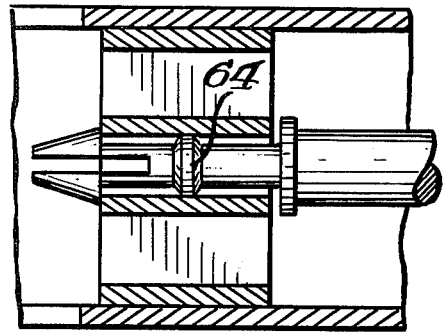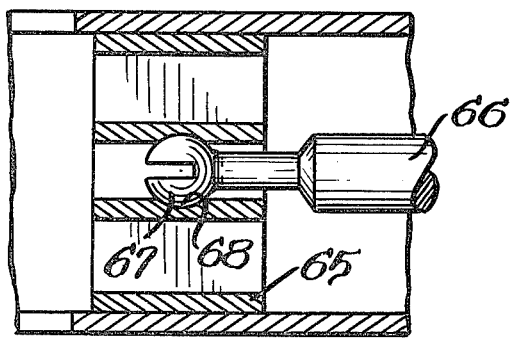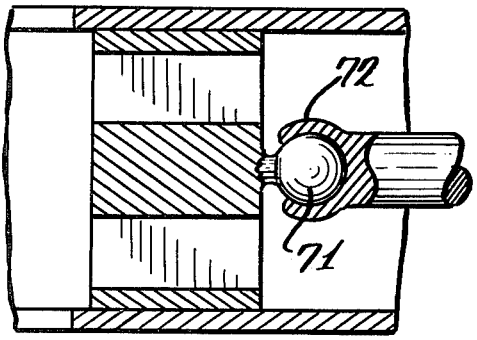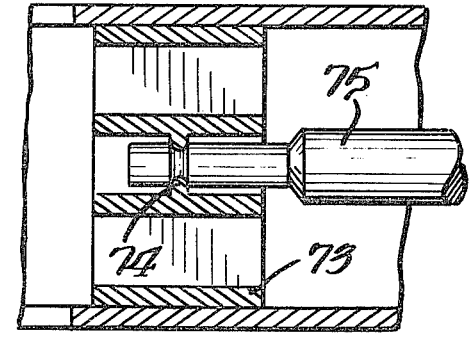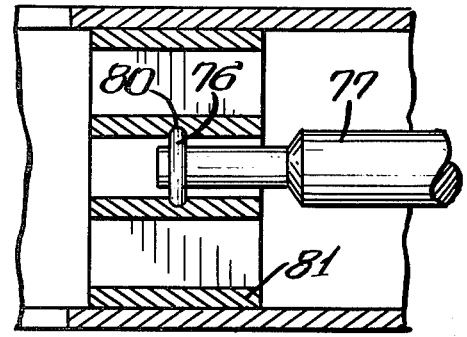

VALVE CONTROLLED FUEL HEATER WITH SELF-ADJUSTING VALVE

BACKGROUND OF THE INVENTION

Engines, and particularly diesel engines, require fuel heaters during cold weather to prevent precipitation of wax from the fuel which tends to plug screens and fuel injectors. Heating of the fuel will correct this, but it is very easy to overheat the fuel, which gives it an abnormally low density which will have an effect on the fuel metering system.

The present invention overcomes these problems as the new heater includes a fuel temperature-actuated valve for bypassing the heated means in the heater.

For compactness, these fuel heaters are preferably elongated but of relatively small diameter with the temperature responsive operating means being located at one end of the heater, a valve body portion of the valve located at the opposite end and the two connected by an elongated stem. The valve body is slidably mounted in the tube in this type of construction with the tube having valve openings by means of which the control of the flow of the fuel is controlled.

Because of this elongated construction and the heating and cooling of the heater parts, it is sometimes possible for the lateral distortion of the valve stem to cause the valve body to tilt and bind with respect to the valve tube.

SUMMARY OF THE INVENTION

With the above difficulties, this invention provides a fuel heater of the above type in which hinge means are provided operatively connecting the elongated valve stem and the valve body for permitting relative lateral movement therebetween so that lateral distortion of the stem, either by changing temperature conditions or for any other reason, will not cause the valve body to bind in the tube within which it travels.

BRIEF DESCRIPTION OF THE DRAWINGS

FIG. 1 is an axial sectional view through a fuel heater embodying the invention;

FIGS. 2 and 3 are transverse sectional views taken substantially along lines 2—2 and 3—3, respectively, of FIG. 1;

FIG. 4 is a fragmentary sectional view similar to a portion of FIG. 1 and illustrating the self-adjusting feature of the valve on relative distortion of the stem 23; and FIGS. 5-10 are views similar to FIG. 4 but illustrating various embodiments of the valve body and with the valve stem shown in each instance in undistorted position.

BRIEF DESCRIPTION OF THE ILLUSTRATED EMBODIMENTS

The fuel heater 10 in the illustrated embodiment comprises an elongated tubular body 11 having opposite ends 12 and 13 providing an inlet passage 14 and an outlet 15. Concentric with the body 11 and coaxial thereto is a bypass tube 16 with the annular flow passage 17 between the tubes 11 and 16 providing an elongated annular space through which the incoming fuel flows as indicated by the arrows 18 under certain operating conditions of the heater.

Within the bypass tube 16 is located a valve means comprising a first cylindrical valve body 21 and a second cylindrical valve body 22 spaced therefrom with both mounted on an axial rod 23 which extends into an enlarged valve body bore 19 so as to fit loosely therein. The forward end of the bore 19 is defined by an inwardly extending annular flange 30.

The bypass tube 16 is provided with a first set of circumferentially arranged, spaced openings 24 adjacent the inlet 14, a second set of circumferentially spaced openings 25 positioned adjacent to the first set 24 and a third set of similar openings 26 adjacent to the outlet 15.

The first valve body 21 is constantly urged toward the right as shown in FIG. 1 to close the openings 25 as illustrated in this Figure. This urging is by a helical spring 27 having one end bearing against the valve body 21 and the other end bearing against a partition 28 that is integral with the tube 16 and has a central fluid opening 29. Thus, the spring 27 comprises yieldable means constantly urging the movable valve means 21 and 22 toward the first position of FIG. 1. In this position, the valve openings 25 are closed by the valve body 21 while the openings 26 remain open due to the retracted position of the valve structure that includes the valves 21 and 22 and the rod 23 on which they are mounted. In this first position as illustrated in solid lines in FIG. 1, the incoming fuel 14 is relatively cold and is directed in the flow path 18 through the annular passage 17 so that the fuel may be heated.

In order to provide this heat, the body 11 is provided with a concentric outer water jacket 32.

This water jacket 32 encloses a hot water chamber 33 that is supplied with hot water as from the cooling system of the diesel engine through an inlet fitting 34 and an outlet fitting 35. Flow of hot water into and through the chamber 33 is illustrated by the arrows 36 and 37. The water jacket 33 heats the tubular body 11 which functions as a heated surface means at the surface 38 from which the flowing fuel 18 receives heat.

In order to aid the efficient heat transfer of heating from the jacket 33 to the fuel 18, there are provided spaced radial fins 41 extending radially across the passage 17 with these fins provided with turbulizing louvers 42 for aid in efficient heat transfer from the jacket to the fuel.

In order to move the valve 42 comprising the valve bodies 21 and 22 and axial rod 23, there is provided a temperature responsive means 43 held in a solid thermostat ring 44 extending across and crimped to the tube 16. The temperature responsive thermostat 43 comprises a temperature sensing element 45 located within the entrance end 46 of the tube 16 to be contacted by the incoming fuel. This thermostat 43 is provided with a plunger rod 47 that engages the rod 23 for actuating bypass valve 42.

The cross-sectional details of the valve bodies 21 and 22 are illustrated in FIGS. 2 and 3.

The end of the tube 16 outwardly of the above body 22 contains the circumferential flow means 26. The valve body 22 mounted on the rod 23 comprises a cylinder 51 and spaced webs 52 on which the cylinder is mounted for sliding movement relative to the inner surface of the tube 16.

The valve body 21 is of similar construction with the body 16 and contains the fluid openings 25 that are adapted to be closed and opened by the cylindrical valve body 21 which is also mounted by means of webs 53 on the end of the rod 23 that is opposite to the end on which the valve body 22 is mounted.

With the parts in the position illustrated in FIG. 1 in which the incoming liquid 14 is relatively cold, the thermostat 43 retains the valve bodies 21 and 22 in retracted position to close the openings 25 and open the openings 26. The incoming cold fuel 14 thereupon passes outwardly through the openings 24, through the annular passage 17 where it is heated by contact with the hot surface 38 and then flows inwardly through the openings 26 and outwardly through the outlet passage 13.

When the incoming fuel 14 is hot, such as above about 80° F., the thermostat 43 forces the valve 42 to the left to open passages 25 and close passages 26.

In this position, the hot fuel 14 enters in the same way as in FIG. 1, flows upwardly through the passages 24 but then immediately flows inwardly through the passages 25 as indicated by the arrows 53 so that the already hot fuel flows axially through the bypass tube 16 and outwardly through the outer end 13 without substantially contacting the heated surface 38.

In the illustrated embodiment, the incoming fuel 14 initially and immediately contacts the sensing element 45 of the thermostat 43. If the incoming fuel is cold, it is directed entirely as indicated by the arrows 18 through the annular passage 17 where it is heated by the hot medium which is hot water in the chamber 13. Because a portion of the fuel is circulated back to the fuel tank, this gradually raises the temperature of the fuel in the tank until the desired temperature is achieved, such as the above-mentioned 80° F. Then, as the temperature rises, the element 45 senses this temperature and adjusts the positions of the valve bodies 21 and 22 accordingly as explained above.

If desired, this same fuel heater could be used but with the flow reversed as indicated by the arrows 57. In this flow direction, which is from left to right in the illustrated embodiment, the fuel does not contact the thermostat sensor 45 until after it has passed substantially through the heater.

When the valve stem 23 is undistorted, the stem is located in coaxial relationship with the parts of the fuel heater including the valve bodies 21 and 22, the tubular body 11, the entrance and exit 12 and 13 and the other parts as illustrated in FIG. 1. Then when the valve stem 23 is distorted as sometimes occurs at high temperatures, the hinge connection of the valve body 22 to the stem 23 which is provided by the enlarged bore 19 permits the valve body 22 to maintain its coaxial relationship while permitting annular distortion of the stem 23 as illustrated in FIG. 4. Note in this Figure that the internally directed thin, end flange 30 closely embraces the ends of the rod or stem 23 and engages the enlarged end 20 of the stem. Thus, the thin flange 30 acts as a fulcrum to permit relative angular movement between the rod 23 and valve body 22.

FIGS. 5–10 illustrate various embodiments of the valve body and rod that permits this angular adjustment. Thus, in FIG. 5, valve body 58 is provided with an inwardly extending annular ridge 61 engaging the circumference of the valve rod 62 and this rod is provided with an annular flange 63 engaging the valve body 58 to retain it in relative position.

In the embodiment of FIG. 6, the parts are similar but here the valve rod is provided with an annular enlargement 64 to provide the hinge action.

In FIG. 7, the valve body 65 and rod 66 are hinged by a ball 67 and socket 68 arrangement.

In the embodiment of FIG. 8, there is a similar ball and socket arrangement, but here the ball 71 is on the valve body while the socket 72 is on the rod.

In FIG. 9, the valve body 73 has an inner opening provided with an inwardly directed annular hinge seat 74 engaging the valve body 75. In FIG. 10, a similar arrangement is provided, but here the annular hinge 76 is on the end of the valve rod 77 while the seat 80 is an annular groove on the inner surface of the hollow valve body 81.

I claim:

1. A fuel heater, comprising:
   a source of fuel passage means for said fuel through said heater;
   heated means;
   a temperature responsive valve body movable between a first extreme position for directing said fuel through a path in heat receiving relationship to said heated means when the fuel temperature is cold, and a second extreme position that directs the fuel to bypass the heat means when the fuel is hot;
   movable temperature responsive means responsive to the temperature of said fuel in said heater for moving said temperature responsive valve body between said first and second extreme positions;
   an elongated, laterally distortable valve stem extending between said temperature responsive means and said valve body and thereby subjected to varying temperatures in said fuel heater for thereby moving said valve body; and
   hinge means operatively connecting said elongated valve stem and valve body for permitting relative lateral movement therebetween, thereby tending to prevent binding of said valve body in misalignment of said stem and valve body due to said varying temperatures.

2. The heater of claim 1 wherein there is provided an elongated valve casing in which is located said passage means, heated means, valve body and temperature responsive means.

3. The heater of claim 1 wherein there is provided yieldable means constantly urging said valve body and valve stem toward said first extreme position.

4. The heater of claim 1 wherein said valve body is provided with an axial opening into which one end of said stem extends with the opening being of larger diameter than said stem end for said permitting of the relative lateral movement therebetween.

5. The heater of claim 4 wherein said valve body at said opening is reduced in diameter to adjacent said stem end at which is located said hinge means.

6. The heater of claim 1 wherein said valve body and valve stem are coaxial in undistorted position.

7. A fuel heater comprising:
   a source of fuel passage means for said fuel through said heater;
   heated means;
   a temperature responsive valve body movable between positions for directing said fuel through a path in heat receiving relationship to said heated means;
   movable temperature responsive means responsive to the temperature of said fuel in said heater for moving said temperature responsive valve body between said positions;

an elongated, laterally distortable valve stem extending between said temperature responsive means and said valve body and thereby subjected to varying temperatures in said fuel heater for thereby moving said valve body;

hinge means operatively connecting said elongated valve stem and valve body for permitting relative lateral movement therebetween, thereby tending to prevent binding of said valve body on misalignment of said stem and valve body due to said varying temperatures; and an elongated valve casing in which is located said passage means, heated means, elongated valve stem and temperature responsive means, said heater having an entrance end and an exit end for said fuel with the heated means being located intermediate said entrance and exit ends and said temperature responsive means being located adjacent to one of said ends.

8. The heater of claim 7 wherein said valve body, valve stem, casing, heater and temperature responsive means are coaxial.

* * * * *